(12) United States Patent  (10) Patent No.: US 7,110,236 B2
Joachim  (45) Date of Patent: Sep. 19, 2006

(54) MAGNETIC SUSPENSION SYSTEM (75) Inventor: Gabriel Louis Joachim, Kowloon (HK)

(73) Assignee: Identified Flying Objects, Limited, Tortola (VG)

( * ) Notice: Subject to any disclaimer, the term of this patent is extended or adjusted under 35 U.S.C. 154(b) by 440 days.

(21) Appl. No.: 10/463,589

(22) Filed: Jun. 18, 2003

(65) Prior Publication Data
US 2004/0052029 A1  Mar. 18, 2004

(30) Foreign Application Priority Data
Jun. 18, 2002 (GB) ................... 0213991.3

(51) Int. Cl.
*H01H 47/00* (2006.01)
(52) U.S. Cl. ..................... 361/139; 361/143
(58) Field of Classification Search ............... 361/139, 361/141, 143, 144, 145, 146, 147
See application file for complete search history.

(56) References Cited
U.S. PATENT DOCUMENTS

| | | | |
|---|---|---|---|
| 4,585,282 A * | 4/1986 | Bosley | .............. 310/90.5 |
| 5,168,183 A | 12/1992 | Whitehead | |
| 5,696,412 A | 12/1997 | Iannello | |
| 6,154,353 A | 11/2000 | Bowers | |
| 6,275,127 B1 * | 8/2001 | French | .............. 335/285 |
| 6,373,676 B1 | 4/2002 | Baker et al. | |

FOREIGN PATENT DOCUMENTS

| | | |
|---|---|---|
| DE | 42 10 741 A1 | 1/1992 |
| EP | 0193664 | 10/1986 |
| EP | 1 035 643 A2 | 9/2000 |
| GB | 1401514 | 7/1975 |
| GB | 2 149 597 A | 6/1985 |
| WO | WO 97/09540 | 3/1997 |

\* cited by examiner

*Primary Examiner*—Brian Sircus
*Assistant Examiner*—Danny Nguyen
(74) *Attorney, Agent, or Firm*—Berenato, White & Stavish (57) ABSTRACT

Systems are disclosed for holding an object in mid-air under the influence of fixed and variable magnetic forces countering the gravitational pull of the object. These systems can be used for display purposes, such as advertising or commercial displays; and/or educational purposes such as spinning globes. It is perceived that the larger the gap between the suspended object and the structure containing the magnets and control systems, the more desirable the device becomes.

6 Claims, 8 Drawing Sheets

MAGNETIC SUSPENSION SYSTEM

BACKGROUND OF THE INVENTION

The current invention is a system for holding an object in mid-air under the influence of fixed and variable magnetic forces countering the gravitational pull on the object.

Such systems can be used for display purposes such as advertising or commercial displays; and/or educational purposes such as spinning globes.

It is perceived that the larger the gap between the suspended object and the structure containing the magnets and control systems, the more desirable the device becomes.

Such a systems has been disclosed in U.S. Pat. No. 6,154,353 whereby a fixed support has an upper station containing a permanent magnet, an electromagnet and a sensor system. The suspended object also has a permanent magnet and floats, below the upper station of the support frame. The permanent magnets are configured so as to attract one another in an upwards direction, countering the downwards gravitational force on the object. Hence a theoretical balance point is defined whereby in the absence of any external influences or fluctuations in the magnetic and gravitational forces, the object would be held steady in mid-air.

In fact, such a balance point is virtually impossible to maintain and so control systems are applied, disclosed for example in DE 4210741, whereby fluctuations in the field provided by the permanent magnet in the object, are interpreted, and consequently the current to the electromagnet in the support frame is adjusted to provide an attractive or repelling force in order to prevent the object moving away from the balance point.

U.S. Pat. No. 6,154,353 discloses such a system modified by the fact that the permanent magnets provide an attractive upwards force slightly greater than the downwards force on the object due to gravity. In this case the electromagnet is normally employed to provide a small repelling force to provide a fine balance and establish what might be called a dynamic balance point.

In the dynamic balance point the object is balanced in mid air by an upward force provided by the attraction of the permanent magnets countered by the forces of gravity plus the repelling force of the electromagnet acting on the permanent magnet in the object.

If the object moves away from the dynamic balance point, stationary sensors detect the change in the field caused by the positional variation of the permanent magnet in the object. If the field rises above a predetermined level the current to the electromagnet is increased and the repelling force consequently increases to push the object downwards. By extension, if the field falls below a certain value the current in the electromagnet is decreased such that the repelling force is reduced and the object is pulled upwards.

The advantages of this system are that relatively small amounts of power are needed to achieve the fine balancing provided by the electromagnet. Furthermore if the power fails the object will move upwards towards the frame rather than downwards. However, the gap between the object and the structure is less than is theoretically possible.

SUMMARY OF THE INVENTION

The intent of the current invention is to provide a system whereby the dynamic balance point is below the theoretical balance point. In such a system the gap between object and frame can be increased compared with prior art systems where the dynamic balance point is above the theoretical balance point.

Furthermore a mechanism is preferably provided to prevent the object falling under gravity should the power fail or be switched off. In this way the system can be configured to provide for the object to either fall or rise when the power is cut off.

Additional modifications, substitutions, features and advantages of the invention will become more readily apparent to those of ordinary skill in the art upon review of the following detailed description of the presently preferred embodiments in conjunction with the accompanying drawings.

DESCRIPTION OF THE PREFERRED EMBODIMENTS OF THE INVENTION

Figure 1:
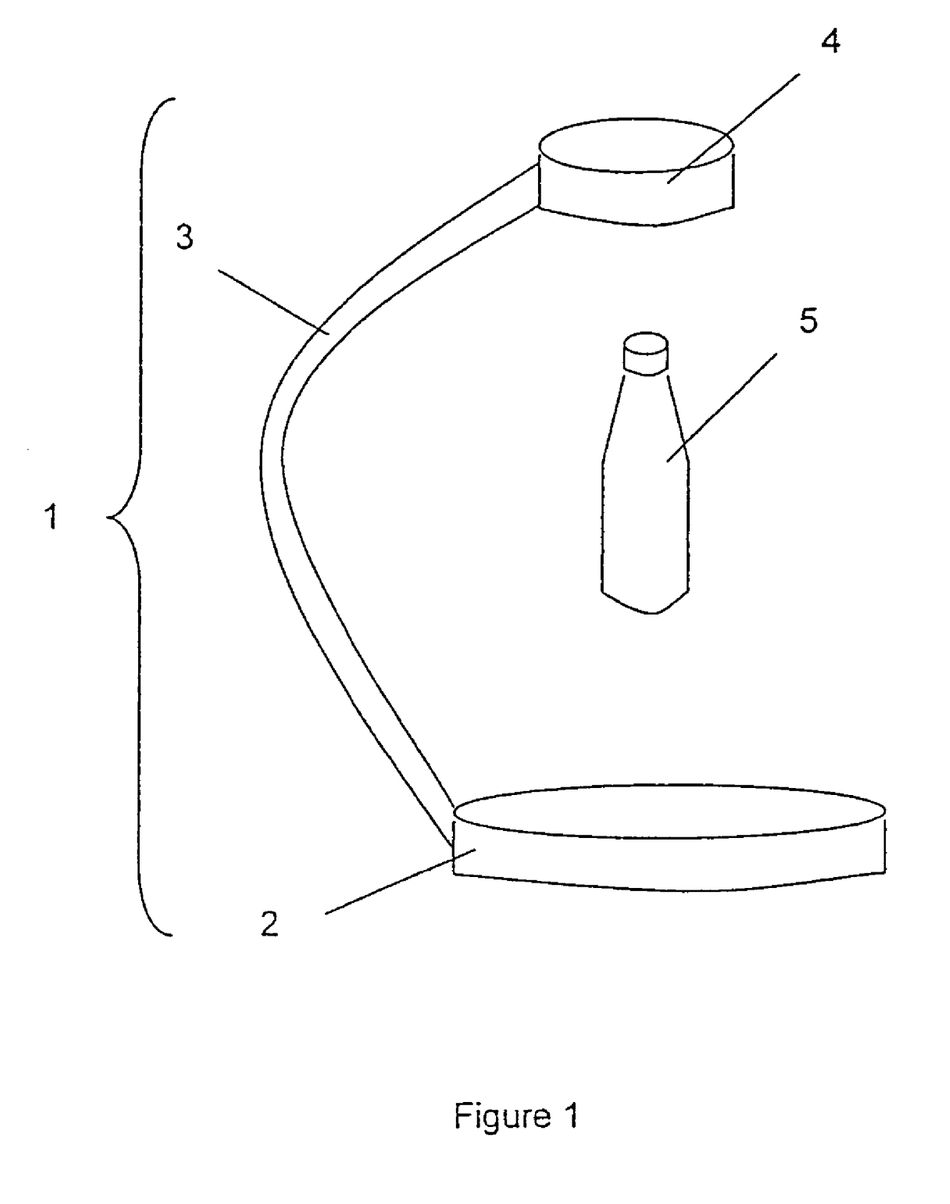
FIG. 1 is a general representation of a typical magnetic suspension system.

FIG. 1 shows a typical manifestation of a magnetic suspension device. The frame (1) is divided into a stand (2), an arm (3) and a head unit (4). These may be constructed integrally or from several joined components. The object (5) is suspended below the head unit.

Figure 2:
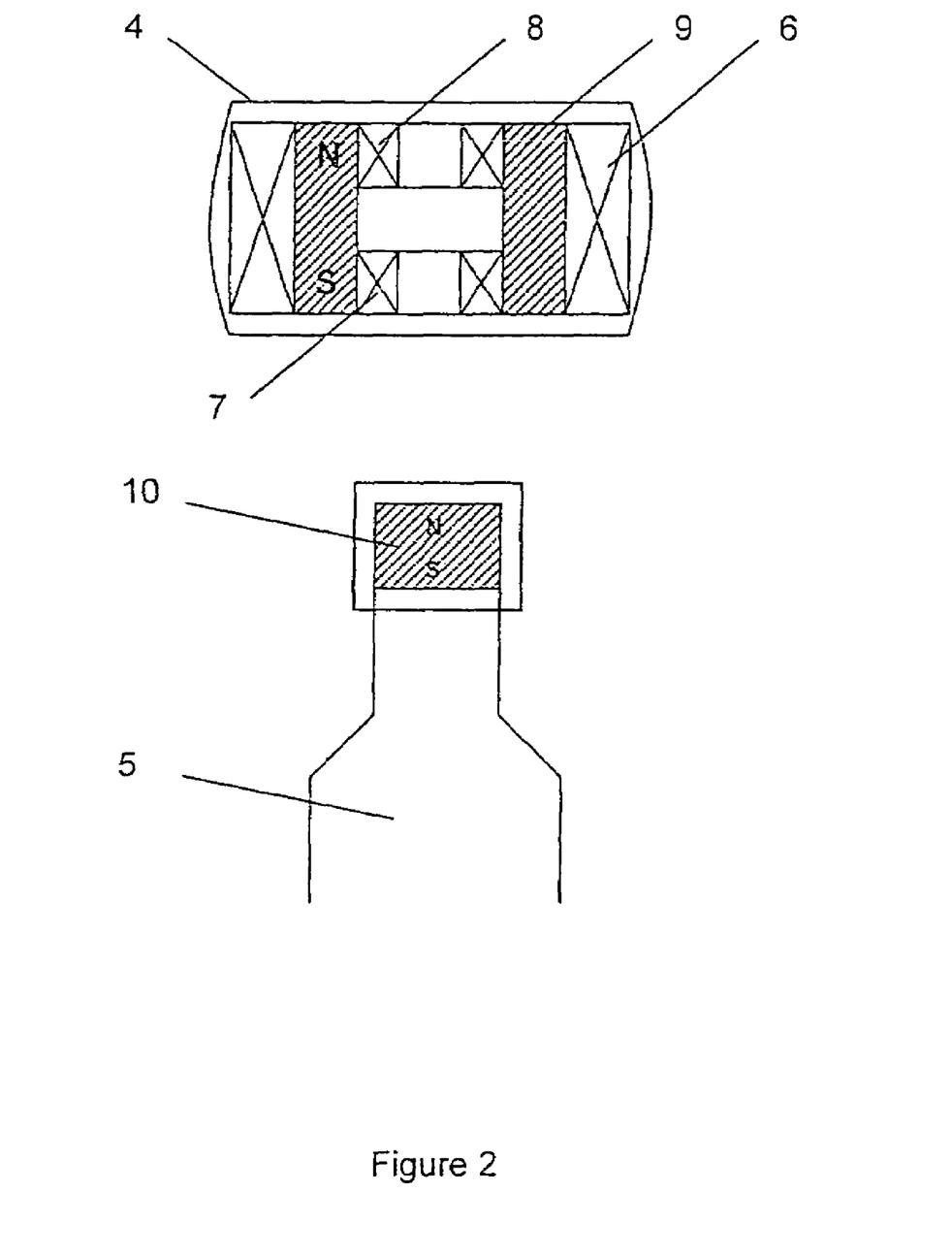
FIG. 2 shows a cross section of physical and magnetic components of the current invention.

FIG. 2 is a cross section of an embodiment of the unit demonstrated in FIG. 1. Inside the head unit (4) is an air core electromagnet (6) which is controlled by a power application circuit which will be described later. A first permanent magnet (9) is mounted within the inner diameter of the electromagnet. Two magnetic field sensor coils (7) and (8) are mounted within the inner diameter of the permanent magnet (9) which in this example is of the ring or "doughnut" type. The windings of the electromagnet and the two sensor coils are coaxial and the axis of magnetization of the permanent magnet is substantially vertical.

The choice of ring geometry for the head unit permanent magnet (9) results in a passive magnetic cushioning effect in the case of the object being rapidly attracted to the upper head. As opposed to a plain cylinder magnet with the same holding force, the ring magnet has a less concentrated source of magnetic flux and also features a region of force reversal, i.e., repulsion, at and around the central hole area.

The object contains a second permanent magnet (10) which is orientated such that the two permanent magnets (9) and (10) are attracted to one another.

The sensor coils (7) and (8) serve to detect the strength of the magnetic field of permanent magnet (10) via suitable signal conditioning circuitry. Alternatively, sensors (7) and (8) may be any other type, e.g., hall sensors, flux gate sensors, etc. The simple induction coils in the embodiment of FIG. 2 are immune to purely static DC magnetic fields, including the B field emanating from permanent magnet (9). Another advantage of passive coils is that they need no power or excitation signals.

Figure 3:
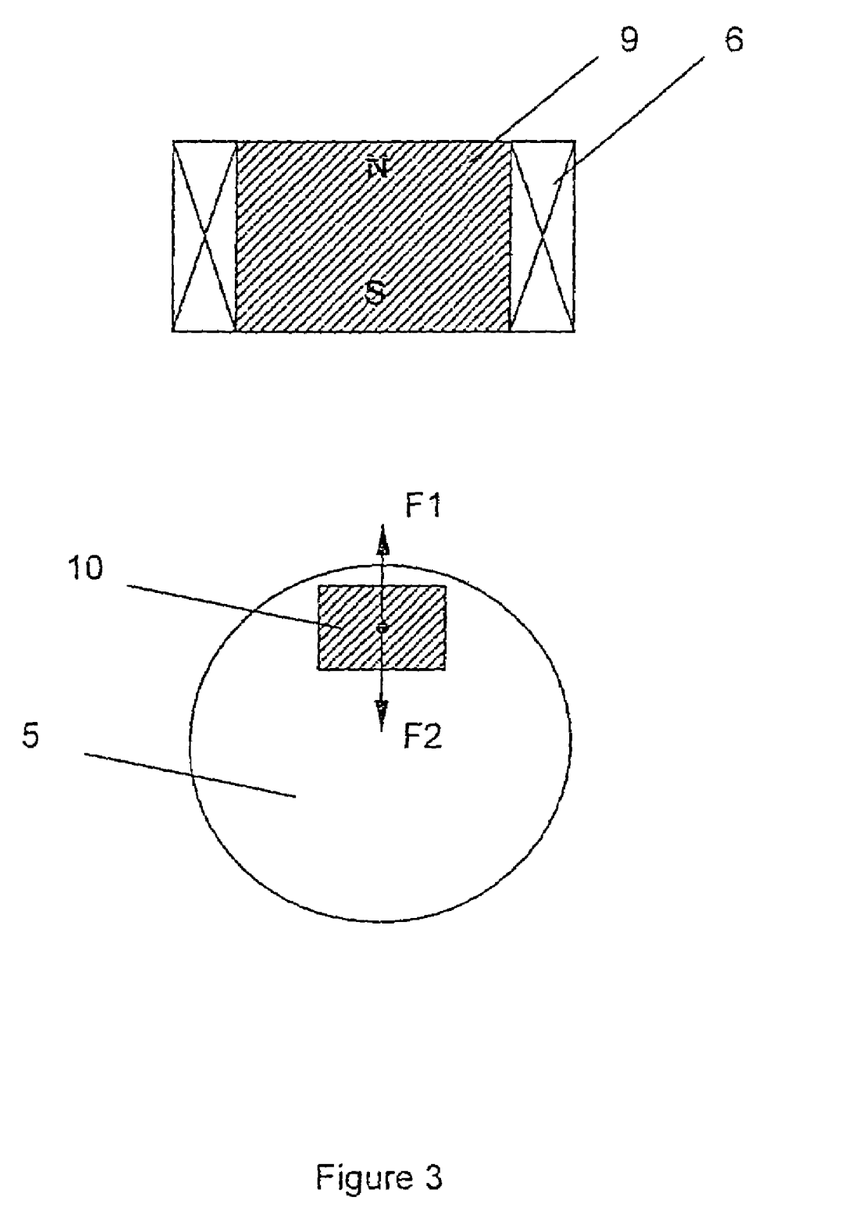
FIG. 3 shows a prior art system with the object held at the theoretical balance point.

FIG. 3 illustrates the concept of the theoretical balance point. In this theoretical example the electromagnet is switched off, the B field detector means is not shown, and permanent magnet (9) is a simple cylinder. The upwards force F1 provided by the attraction between the two permanent magnets (9) and (10) is exactly balanced by the downwards force F2 provided by the acceleration due to gravity acting on the object (5).

It is impractical under normal circumstances to provide a magnetic suspension unit which utilises the theoretical balance point to suspend an object, with power to the electromagnet normally off. In the mathematical treatment of static permanent magnetic fields it is proven that there is no stable equilibrium point possible. This can be understood intuitively by seeing firstly it is very difficult to place the object exactly in position without any residual movement or forces on the object; and secondly, any perturbation or fluctuation in the ambient magnetic or gravitational fields or random microscopic motion of the object will result in an always decreasing or increasing upwards force on the object. Initial upward motion propels the object magnet towards the upper magnet. Conversely initial downward motion causes gravity to always be stronger than the decreasing upward magnetic pull, thus the object falls.

Figure 4:
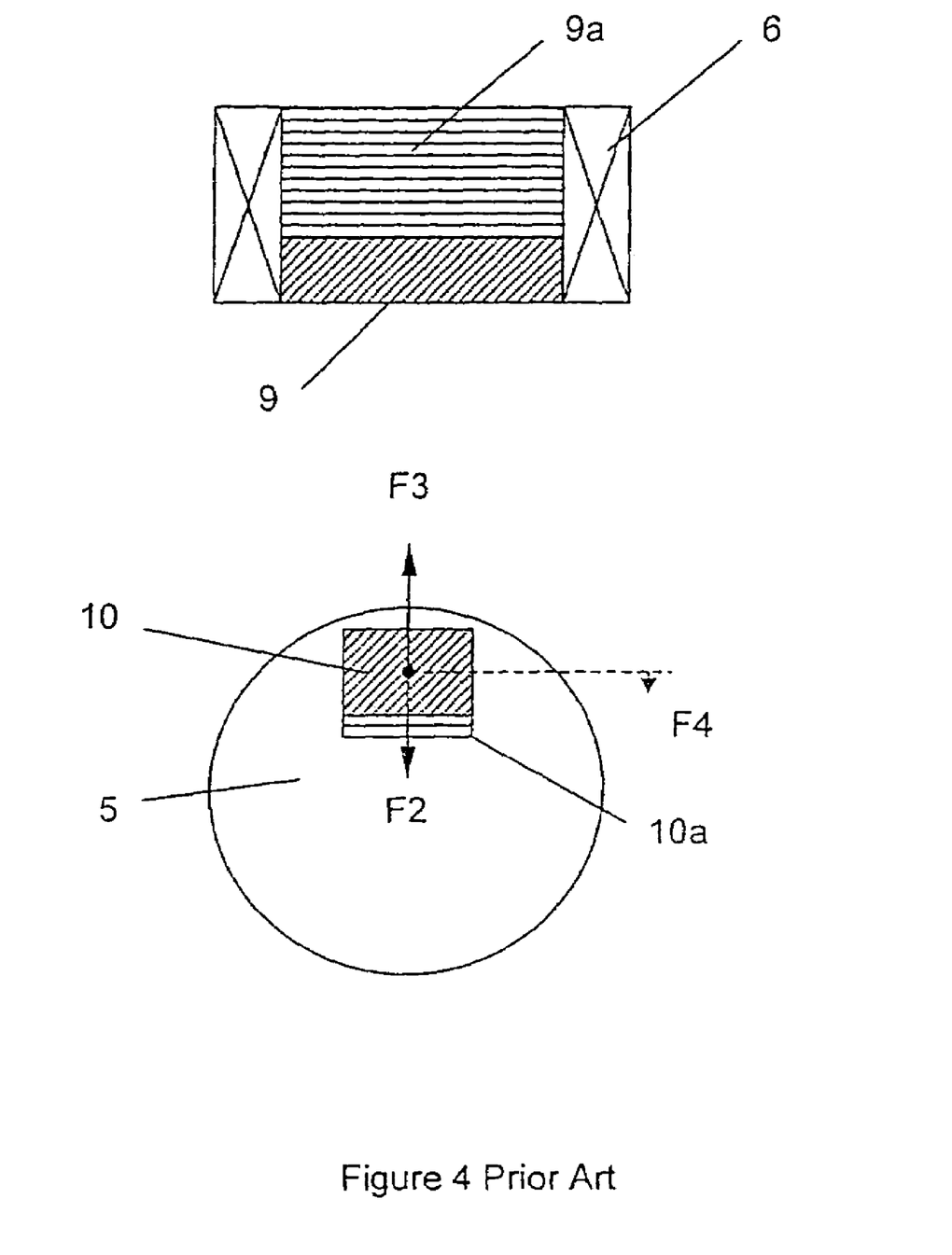
FIG. 4 shows a prior art system with the object held at a dynamic balance point above the theoretical balance point.

FIG. 4 shows a prior art system (utilizing ferromagnetic flux line concentrators (9a) and (10a)) whereby a dynamic balance point is established slightly above the theoretical balance point. To counter the increased attraction between the two permanent magnets (9) and (10) a small amount of current is caused to flow through the coil of the electromagnet which establishes a repelling force between the electromagnet and the second permanent magnet (10) in the object (5). In this system the upwards force F3 caused by the attraction between the permanent magnets (9) and (10) is balanced by the sum of the downwards force F2 due to gravity and the repelling force F4 between the electromagnet (6) and the second permanent magnet (10).

In summary:
F1=F2 to define the theoretical balance point
F3=F2+F4 to define the dynamic balance point.

Still with FIG. 4 it will be appreciated that in the steady state a small current is required to flow through the coils of the electromagnet (6) to maintain repelling force F4. If for any reason the steady state is disturbed the object might move either upwards or downwards from the dynamic balance point. When the object moves upwards the field (detected by the not shown sensor means), emanating from the second permanent magnet (10) in the object increases. When this increase reaches a certain value the current through the electromagnet is caused to increase, thus increasing the repelling force and pushing the object back downwards to the dynamic balance point, Conversely when the object moves downwards the field detected by the sensor means decreases. When this decrease satisfies predetermined conditions the current through the electromagnet is caused to reduce in such a way that the repelling force between magnet (10) and electromagnet (6) decreases and the object is restored to the dynamic balance point under the influence of the attraction between the permanent magnets (9) and (10) and the electromagnet (6).

Thus it can be seen that with a suitable control system, the object can be held substantially at the dynamic balance point indefinitely. It is worth noting at this stage that if the power to the electromagnet (6) is cut off either accidentally, such as in an interruption to the mains power; or deliberately when the owner switches off the unit, the object will usually rise and come to rest against the head unit under the attraction between the permanent magnets (9) and (10), in all cases except where the object is left with a net downward force or where the power cut takes place at a point in time when the object is below the theoretical balance point.

Figure 5:
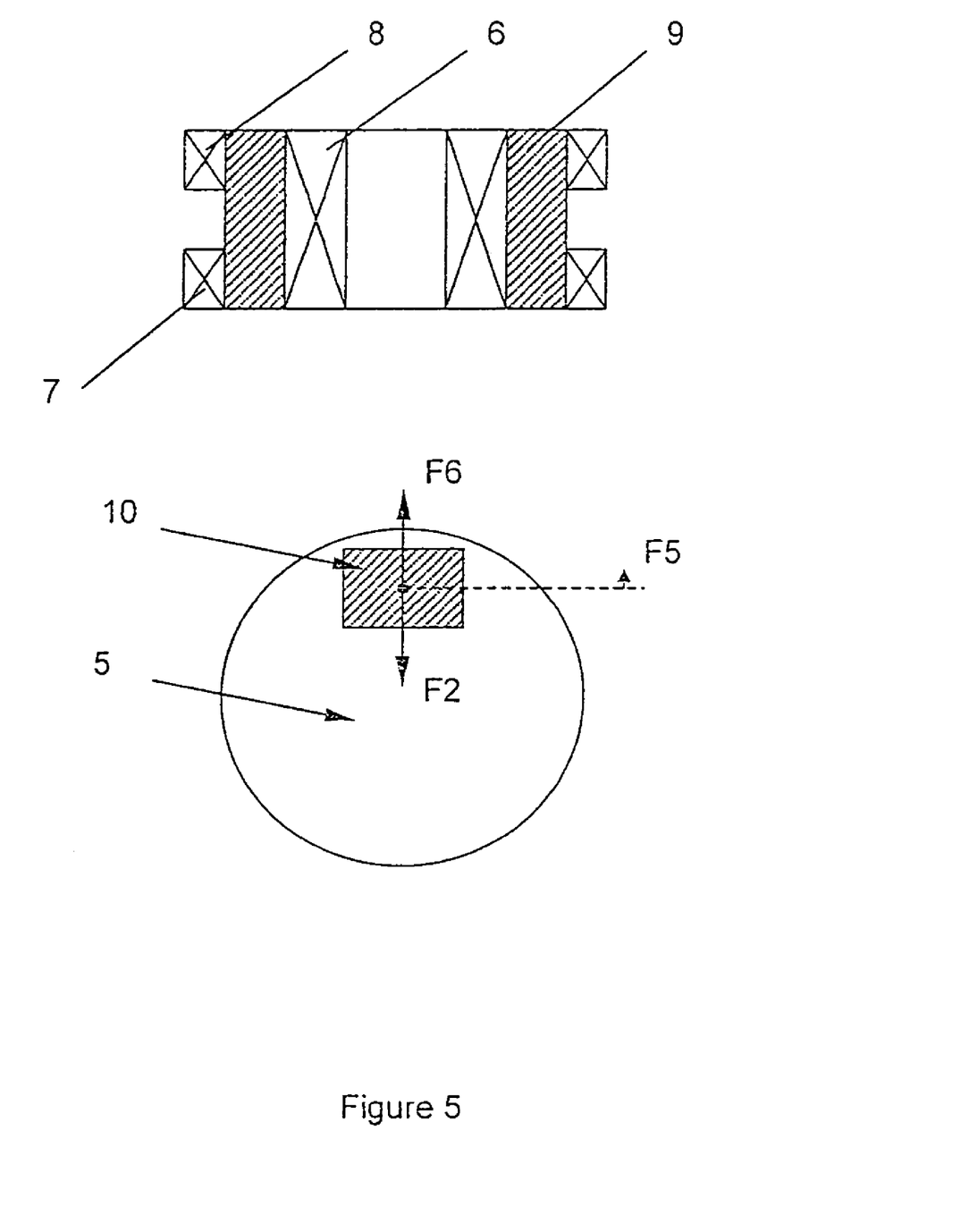
FIG. 5 shows the dynamic balance point of the current invention.

FIG. 5 is a schematic of an embodiment of the current invention whereby the dynamic balance point is located below the theoretical balance point. In this case the current through the windings of the electromagnet (6) flows in the reverse direction to that of FIG. 4 to create an attractive force F5 between the electromagnet and the permanent magnet (10) on the object. The electromagnet (6) is shown placed within the inner diameter of ring permanent magnet (10) and serves as an example of an alternative geometry to FIG. 2, also, sense coils (7) and (8) are placed around the outer diameter permanent magnet (10) by way of example.

Because the object (5) is further from the head unit (4) containing permanent magnet (9) the attractive force F6 between the permanent magnets (9) and (10) is less than in the prior art example shown in FIG. 4. In this case the dynamic balance point is defined by:

$$F5+F6=F2$$

Where F2 is the gravitational force acting on the object.

In this embodiment of the invention the control system on the current passing through the windings of the electromagnet is substantially the same, except that when the object goes below the dynamic balance point (i.e. starts to fall) the current is caused to increase in such a way that dynamic balance is restored; and when the object goes above the dynamic balance point the current is caused to reduce.

It can be seen that in this embodiment of a magnetic suspension system, if the power is cut off, the object will normally fall except in circumstances where it is already endowed with an upwards force or where it is momentarily above the theoretical balance point.

Figure 6:
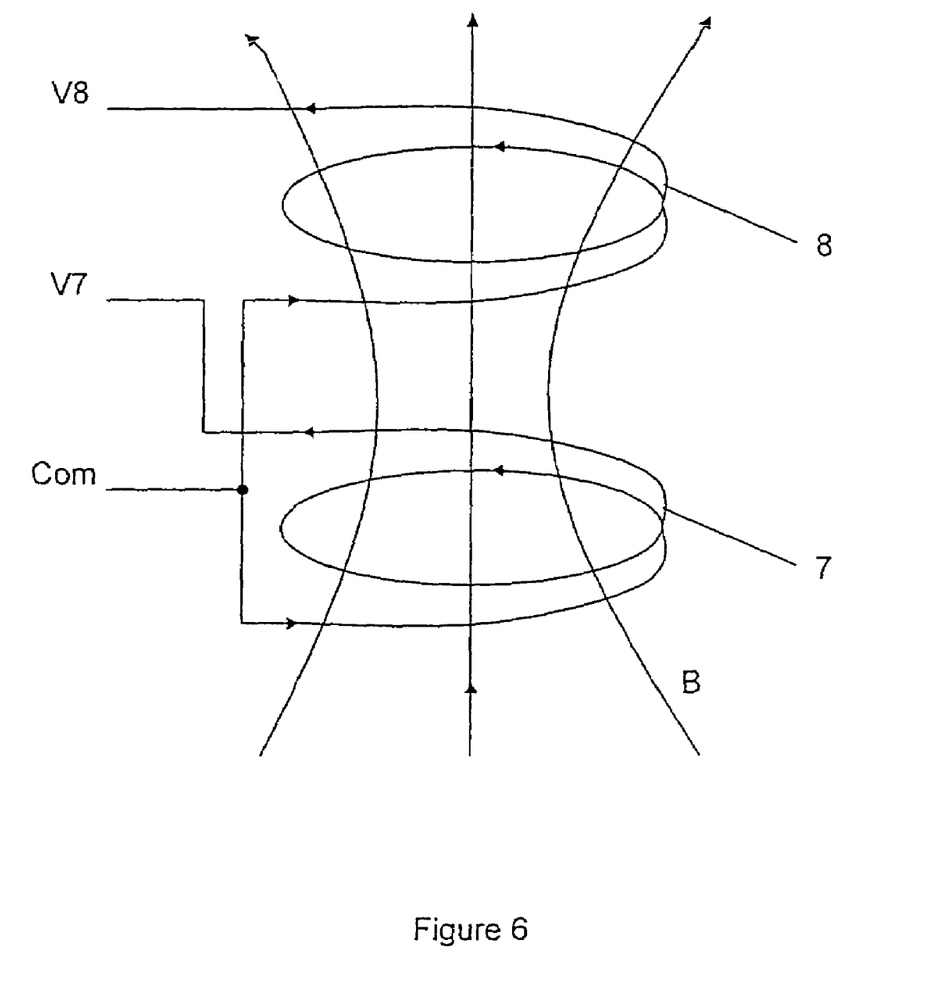
FIG. 6 shows the sensors and representational magnetic flux lines passing through them.

FIG. 6 shows the arrangement of the sensors according to the current invention. Magnetic field sense coils (7) and (8) consisting of many turns of wire wound around an air core are wound with their turns encircling the vertical z axis with coil (8) placed directly above coil (7), preferably separated as shown in FIGS. 2 and 5 which serve to illustrate two possible embodiments. Lines of magnetic flux B emanate from not shown sources: the object permanent magnet, the upper head unit permanent magnet, the head unit electromagnet, and the environment. These lines are shown passing through the inner area of each sense coil, with induced voltages V7 and V8 arising from any changes in quantity of magnetic flux. The induced voltages are with respect to the indicated anti-series connection. Thus this sensor arrangement acts as a gradiometer responding only to differences between amounts of the changing magnetic field. That is, if sensor (7) and sensor (8) see the same changing field V7 will equal V8 and the differential output is zero. Object magnet (10) however will influence sensor (7) more than sensor (8) because it is closer to (7); there will then exist a net induced voltage output.

Figure 7:
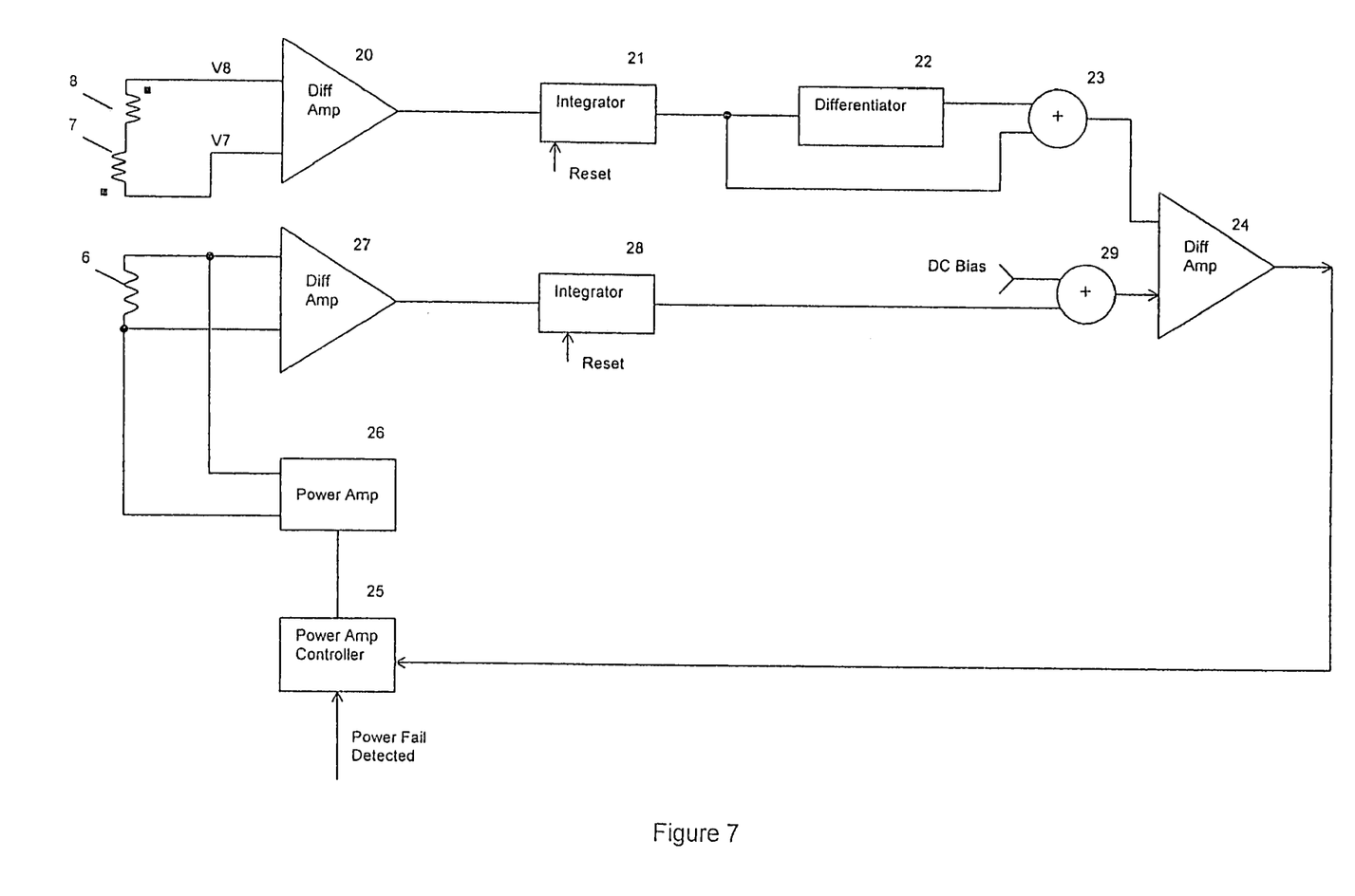
FIG. 7 is a block diagram representation of the control circuit for magnetic suspension.

FIG. 7 describes the control circuit which holds the object in a state of levitation below the theoretical balance point. It will be appreciated that the functions outlined can be implemented via analogue circuitry or coded as numerical processing algorithms running on a Digital Signal Processor IC or a microprocessor IC; the appropriate digital/analogue input/output conversions derivable by those skilled in the art.

Sensor signals V7 and V8 are fed to a difference amplifier (20) whose output is integrated by leaky integrator (21) in order to transform the AC nature of the sensors' induced voltage signal to a quasi-DC signal with a decay constant of about 20 seconds. A portion of the signal from integrator (21) is summed via summation block (23) with a time differentiated portion, differentiator (22)'s output, to yield the object position plus velocity signal. One input of differential amplifier (24) is fed by the summation output (23). The output of differential amplifier (24) is fed to a power amplifier controller (25) which exercises a well-known algorithm based on the object's position and velocity status. The power controller (25) drives a power amplifier (26) to excite electromagnet (6) with the proper amount and direction of restoring force current to keep the object levitated. The power amplifier may be of any conventional type, e.g., bipolar dual-supply or single supply H-bridge types. Each of these types may vary the current in a linear fashion or via pulse width modulation control. The low frequency differential voltage variations e.g., less than 30 Hz, across electromagnet (6) are detected by differential amplifier (27) whose output is fed to leaky integrator (28). The time constant of integrator (28) is longer than that of integrator (21), and is summed with a DC bias level in summation block (29). Thus the output of (29) serves to set the reference level of current in electromagnet (6) that the system will settle to. If the DC bias is zero, the levitated object will be held with microscopic fluctuations very near the theoretical balance point. A constant DC bias of one polarity causes the system to settle at a dynamic balance point above the theoretical point; the opposite polarity causes the dynamic balance point to be at the preferred position below the theoretical balance point.

Figure 8:
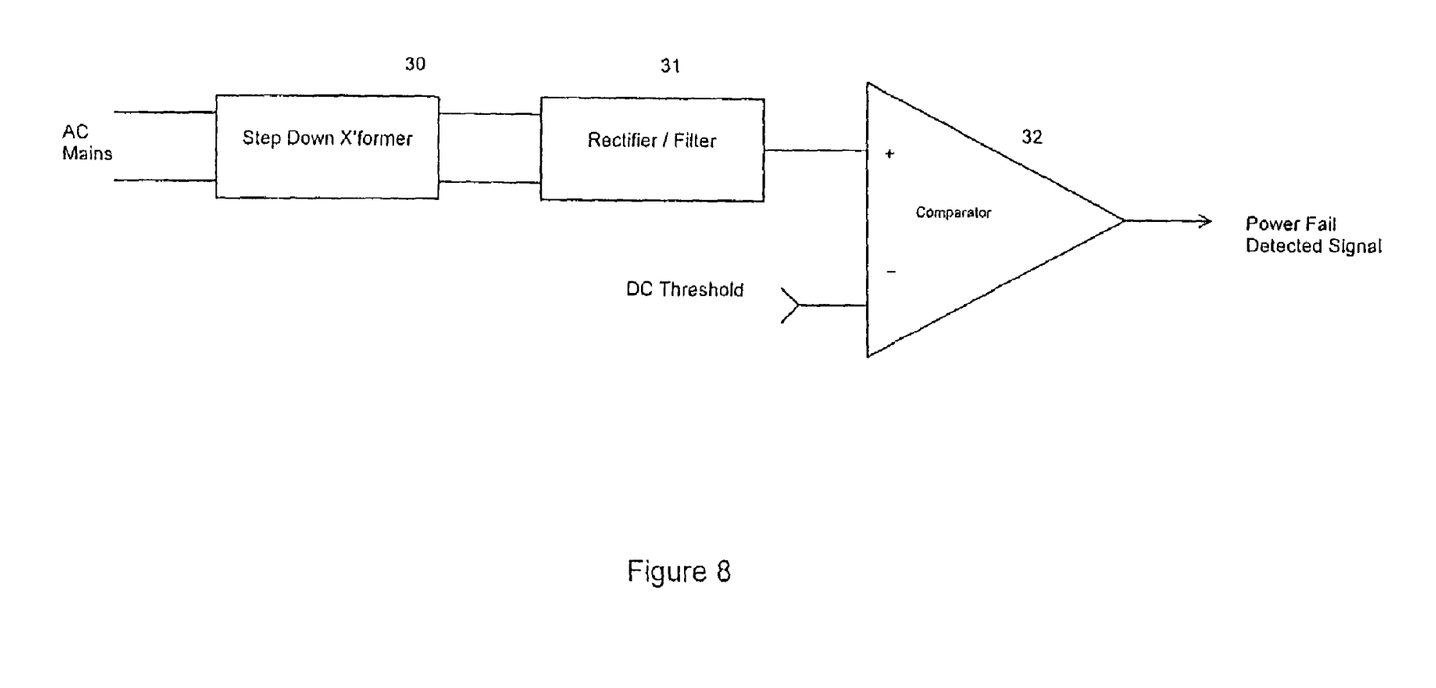
FIG. 8 is a block diagram representation of the control circuit for detection of a power cut-off and provision of surge to electromagnet.

FIG. 8 describes the control circuit according to the current invention which predicts a power shutdown and causes the current through the electromagnet (6) to rise sufficiently to ensure that the object will immediately be pulled upwards until brought to rest against the head unit. The AC mains power voltage is stepped down via system power supply transformer (30). In a addition to feeding the main system power, the stepped down AC voltage is rectified and filtered by a fast typically 40 Hz cut off low pass filter (31). Therefore a sudden drop or loss of AC power will result in the rectified DC level at the positive input of comparator (32) to fall below the constant DC threshold level present at (32)'s negative input. The output of comparator (32) thus goes low providing a Power Fail Detected logic signal. The system power supply which utilizes typical large time constant ripple filters will still have time to respond to the AC mains loss. The Power Fail Detected signal triggers power amp controller (25) to immediate increase the electromagnet (6)'s attractive current to nominally ¼ of its full value thus pulling the object with magnet (10) attached upward. When the object is above the theoretical balance point the system power supply and electromagnet (6) can be completely without power but the upward direction of the object is now assured due to the passive attractive magnetic force overcoming gravity.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

The invention claimed is:

1. An apparatus for supporting an object by balancing gravitational force against magnetic forces such that there are no physical supports provided to the object, comprising: a frame constituting an upper station and a structure to support the upper station, a permanent magnet, an electromagnet and a sensor system all contained in the upper station, and an object containing a permanent magnet, the object being movable between a theoretical balance point where the gravitational force on the object is balanced by the attraction between the permanent magnet on the object and the permanent magnet on the upper station of the frame, and a dynamic balance point, below the theoretical balance point, where the attraction between the permanent magnet on the object and the permanent magnet on the upper station is weaker than at the theoretical balance point, and for which the electromagnet in the upper station is capable of compensating by providing a magnetic force, the apparatus further comprising a feedback circuit comprising the sensor system and a controller to control electrical current to the electromagnet, provided by a power supply, to urge the object towards the dynamic balance point whenever the object is not at the dynamic balance point, wherein the apparatus further comprises a second circuit for detecting a loss of supplied power, the feedback circuit and/or second circuit being capable of responding to any sensed loss of power by providing sufficient current to the electromagnet to pull the object upwards, above the theoretical balance point, such that should the power fail completely, the object will come to rest in the proximity of the upper station.

2. An apparatus according to claim 1 wherein the feedback circuit is operable to increase the current to the electromagnet when the object is below the dynamic balance point to urge the object upwardly and vice-versa.

3. An apparatus according to claim 1 where the permanent magnet contained in the upper station is toroidal and the axis is substantially vertical.

4. An apparatus according to claim 3 where the sensor system comprises two coils with a substantially vertical common axis.

5. An apparatus according to claim 4 where the sensor coils are arranged inside the toroidal permanent magnet.

6. An apparatus according to claim 4 where the sensor coils are arranged outside the toroidal permanent magnet.

* * * * *